Patented July 4, 1933

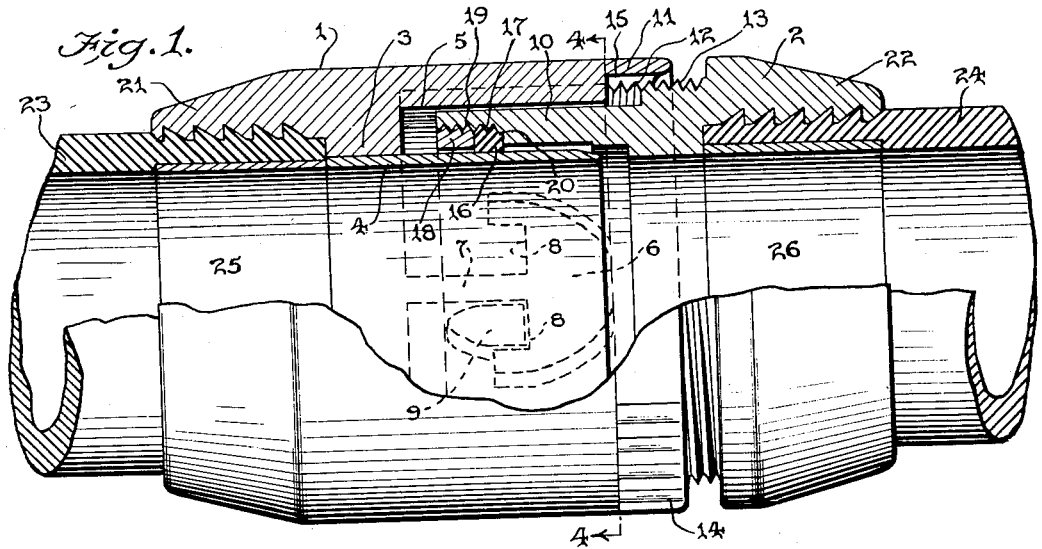
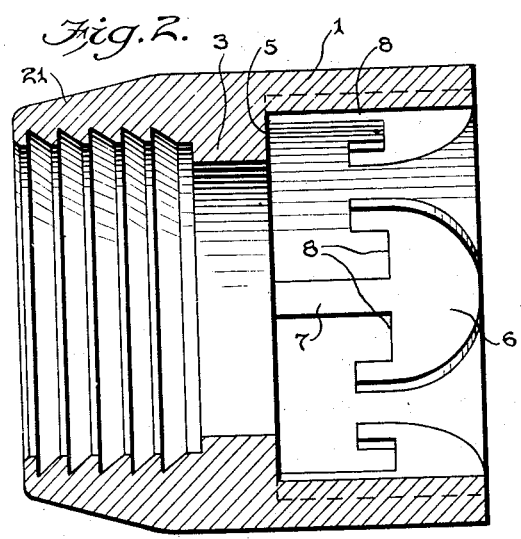
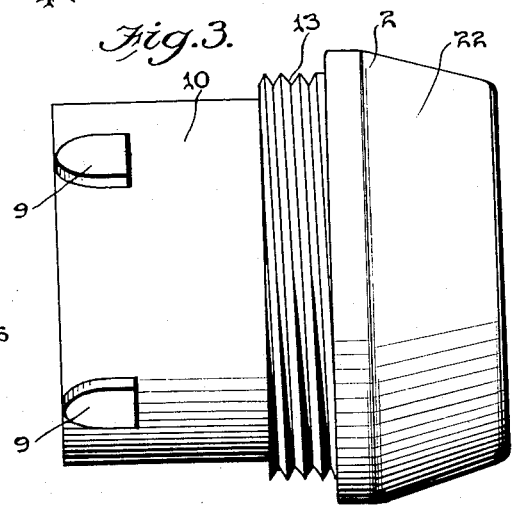
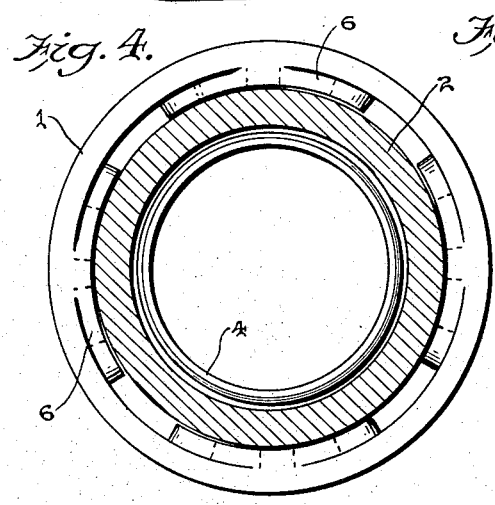
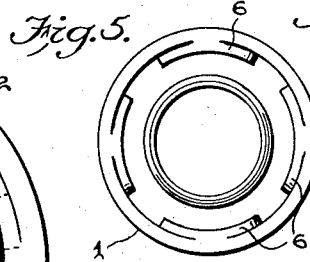
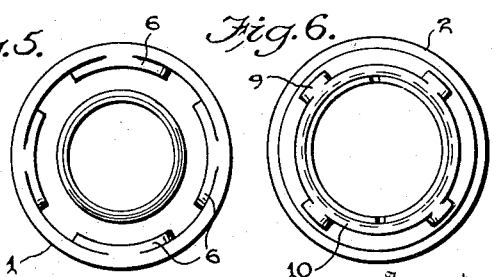
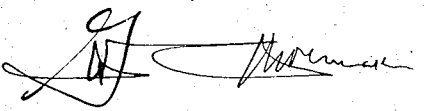

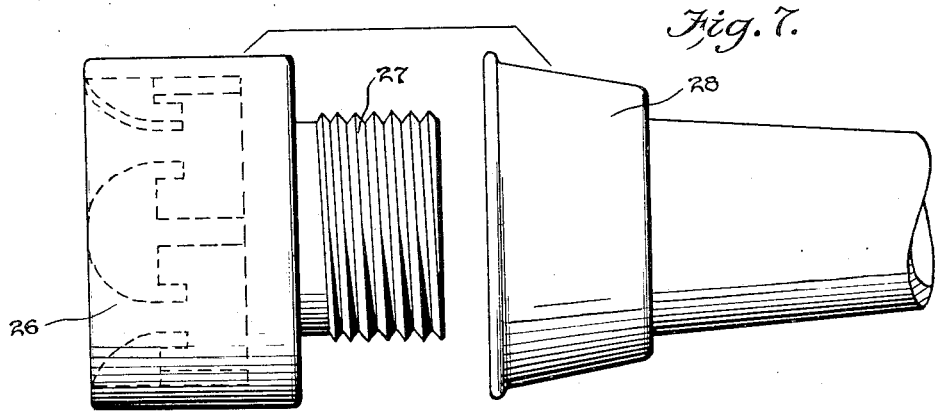
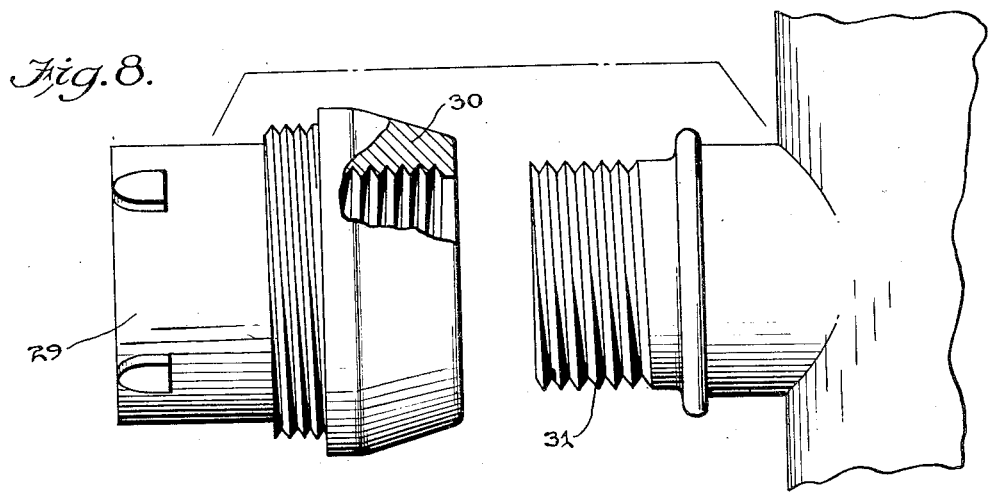
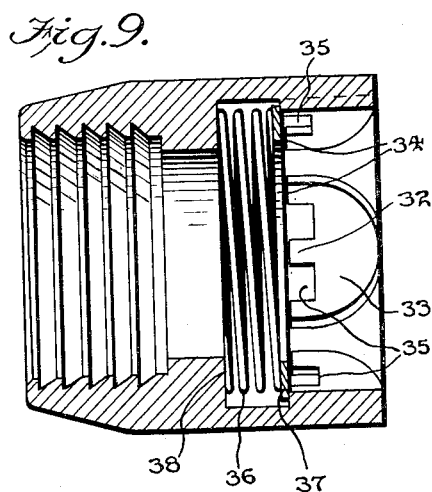
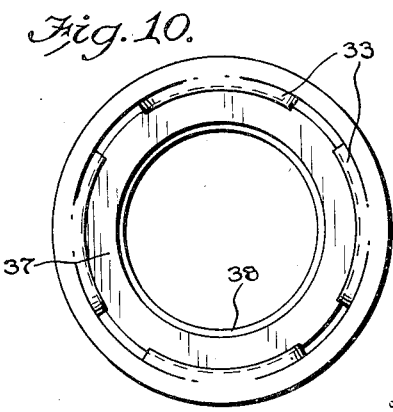
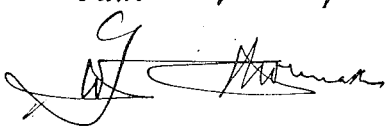

1,916,449

UNITED STATES PATENT OFFICE

JOHN JOSEPH TOMPKINS, OF LAKELAND, FLORIDA, ASSIGNOR OF ONE-HALF TO ROBERT EUGENE SMITH, OF LAKELAND, FLORIDA

HOSE AND PIPE COUPLING

Application filed March 23, 1931. Serial No. 524,708

The invention relates to a hose and pipe coupling.

The object of the present invention is to provide a simple, practical and efficient hose and pipe coupling of strong, durable and comparatively inexpensive construction adapted to be readily coupled and uncoupled, and capable of preventing leakage especially when subjected to high pressures, and having its coupling mechanism arranged substantially interiorly of the coupling so as not to be exposed to damage when the parts are coupled and a hose is in use.

With these and other objects in view, the invention consists in the construction and novel combination and arrangement of parts hereinafter fully described, illustrated in the accompanying drawings, and set forth in the claims hereto appended, it being understood that various changes in the form, proportion and minor details of construction, within the scope of the claims, may be resorted to without departing from the spirit of the invention or sacrificing any of the advantages thereof.

In the drawings:—

Figure 1 is a side elevation, partly in section, of a pipe and hose coupling, constructed in accordance with this invention.

Fig. 2 is a longitudinal sectional view of the female section or member with the inner wall removed to show the female lugs.

Fig. 3 is a side elevation of the male section or member.

Fig. 4 is a transverse sectional view on the line 4—4 of Fig. 1.

Fig. 5 is an end view of the female section showing the inner end thereof.

Fig. 6 is a similar view of the male member.

Fig. 7 is a side elevation of a portion of the coupling showing the female member reduced and threaded at the outer end portion to engage a standard nozzle.

Fig. 8 is a side elevation, partly in section, of a portion of the coupling showing the male member reduced at the outer end portion and interiorly threaded to screw on the nozzle of a standard fire plug.

Fig. 9 is a longitudinal sectional view of the female member of the coupling illustrating a modification of the invention in which a spring pressed washer is employed for holding the sections in place when coupled.

Fig. 10 is an end elevation of the female member shown in Fig. 9.

In the accompanying drawings, in which is illustrated the preferred embodiments of the invention, the pipe and hose coupling comprises in its construction a female section or member 1 and a male section or member 2. The female member is provided on its interior approximately midway between its ends, with an interior annular rib 3 which is approximately rectangular in cross-section, and presents flat inner and outer side faces and a cylindrical surface at the inner edge to receive the inner end portion of an annular inner wall 4. The annular inner wall 4 which may be secured at its inner end to the cylindrical face of the annular rib by any suitable means, is spaced from the body portion of the female member to provide an intervening annular space 5 to receive the male member.

The coupling end of the female member has a greater interior diameter than the attaching end and is provided on its interior with double female lugs 6 of approximately T-shaped consisting of a tapering head and a stem 7, the head projecting laterally beyond the side edges of the stem at the juncture of the said parts and provided at each side of the stem with a recess 8 to form a bayonet slot at each side of the stem 7 to be engaged by lugs 9 arranged on the exterior of the male member. The lugs 6 and 9 are formed integral with the female and male members of the coupling and the coupling portion 10 of the male section is reduced slightly and is cylindrical, and it fits in the annular space 5 between the inner and outer walls of the coupling portion of the female member when the parts are coupled, as clearly illustrated in Figs. 1 and 4 of the drawings.

The male lugs which are tapered towards their outer end have straight inner edges and are of a width to fit snugly in the recesses 8 of the female lugs, and in the coupling of the members the male member is inserted in the annular space 5 until the straight inner edges of the lugs 9 are carried inwardly past the laterally projecting portions of the heads of the female lugs and the members are turned or given relative rotary movement to carry the male lugs into engagement with the adjacent side edges of the stem portion 7 of the female lugs. This rotary movement aligns the male lugs with the recesses 8 of the female lugs. The sections of the coupling are then moved outwardly in a longitudinal direction a limited distance sufficient to carry the male lugs into the recesses 8 of the female lugs. This will hold the sections of the coupling against relative rotary movement.

The sections of the coupling are locked against relative inward longitudinal movement to retain the lugs 9 in the recesses 8 by means of a clamping ring 11 interiorly threaded at 12 for engaging exterior threads 13 formed on the male member midway between the ends thereof, as clearly illustrated in Figs. 1 and 3 of the drawings. The clamping ring 11 which has exterior notches 14 to enable it to be readily rotated, is also provided with interior transverse recesses 15 to enable the ring to be readily passed over the lugs 9 in assembling the parts. After the members of the coupling are interlocked, the clamping ring 11 is screwed inwardly into contact with the inner end of the female member to form a stop for holding the members of the coupling against relative longitudinal movement.

When it is desired to uncouple the members the combined clamping and stop ring 11 is run back on the screw threads 13 of the male member of the coupling to permit the necessary relative longitudinal movement of the members to disengage the interlocking lugs 6 and 9 thereof. Owing to the particular construction of the female lugs, which provide the bayonet slots at opposite sides of the stems 11 the members of the coupling may be rotated in either direction to carry the lugs 9 into alignment with the recesses 8 after the male member has been inserted in the female member and the lugs of the male member have been carried to a position beyond the laterally extending portions of the heads of the lugs 6. This will greatly facilitate the rib coupling of the members. In uncoupling the members the lugs 9 are brought to a position in alignment with the spaces between the heads of the female lugs and the members of the coupling may then be readily separated.

The outer end 4 of the inner wall of the female member extends to a point adjacent the plane of the outer end of the female member, as clearly illustrated in Fig. 1 of the drawings, and there is a slight intervening space between the cylindrical coupling portion of the male member and the said inner wall 4 when the members are coupled. This intervening space which permits or facilitates ready coupling and uncoupling of the members and also admits fluid pressure to an elastic gasket or packing 16 securely held in a recess 17 in the inner face of the coupling portion of the male member 2 by a metallic gland ring 18.

The gland ring 18 which is exteriorly threaded engages the interior screw threads 19 of the recess 17 of the male member. The elastic gasket or packing which is firmly clamped in the recess 17 against a shoulder 20 formed by the inner end of the recess 17 is firmly pressed against the inner wall 4 by the fluid pressure within the coupling and the higher the pressure of the water or other liquid, the tighter the elastic gasket or packing will be held against the inner wall 4, and it will be clear that ample provision against leakage is thus provided. The spacing of the outer end of the inner wall from the male member permits ready access of the liquid under pressure to the gasket or packing 16 and the metallic gland is provided at spaced points with suitable recesses to enable it to be readily engaged by a spanner or other tool or screwing it into and out of the male member.

The outer portions 21 and 22 of the female and male members of the coupling are interiorly grooved or threaded to receive pipe or hose sections 23 and 24 which are maintained tightly in engagement with the grooves or threads by metallic lining sleeves 25 and 26. These metallic lining sleeves are of the ordinary construction and the coupling members may be secured on the pipe or hose sections in any desired manner, as will be readily understood.

In Fig. 7 of the drawings is illustrated a female coupling member 26 which has its outer portion 27 reduced and exteriorly threaded to receive a standard hose nozzle 28 which is adapted to be screwed on and off the threaded portion 27 of the female member of the coupling in the usual manner.

In Fig. 8 of the drawings is illustrated a male coupling member 29 which has its outer portion 30 reduced and interiorly threaded to screw on the threaded nipple or outlet 31 of a standard fire plug.

In Figs. 9 and 10 of the drawings is illustrated another form of the invention in which the stem or portion 32 of the female lug 33 terminates in the plane of the inner end edges 34 of the said lug 33. The female lug 33 is tapered and is provided at opposite sides of the truncated stem or portion 32 with recesses 35 to receive the coacting lugs of the male member of the coupling. The male member which is constructed the same as that heretofore described, is adapted to be interlocked with the female member or coupling, as heretofore explained, and when the male lugs are arranged in the recesses of the female lugs, the members of the coupling are retained in their interlocked relation by a spiral push spring 36 and an annular washer 37 which is engaged by the spring 36, and the spring and the washer are located in the space between the female lugs 33 and the interior annular rib 38. The spiral push spring is designed to be of sufficient strength to hold the members interlocked when coupled and the male and female lugs will snap into engagement or interlocked relation when the members of the coupling are put together and the male lugs brought to a position in alignment with the recesses of the female lugs.

When the members of the coupling are coupled the coupling presents a substantially smooth exterior so that there is no liability of the parts of the coupling being injured by the breaking of a hose over hard and uneven surfaces.

Also, when the interior push spring and washer are employed for holding the members of the coupling in engagement with each other, the exterior of the coupling is entirely free of movable parts and the coupling means are completely housed and concealed within the male and female members.

What is claimed is:—

1. A coupling of the class described comprising a female member provided between its ends with an interior annular rib and having an inner wall extending outwardly from the said rib and spaced from the inner face of the outer portion of the female member to provide an intervening annular space, said inner wall extending to a point adjacent the plane of the outer end of the female member, a male member having a cylindrical portion extending into the said annular space, said male member being provided at its outer end with an interiorly arranged annular recess having a threaded portion, the male member being spaced from the said inner wall, a threaded metallic gland ring engaging the threads of the said recess, an elastic gasket clamped in the recess by the metallic gland and having a portion fitting against the said inner wall and arranged to be held against the said inner wall by the pressure of water or other liquid in the coupling.

2. A coupling of the class described including a female member provided at its outer end with spaced inner and outer walls forming an annular intervening space, tapered female lugs carried by the female member and arranged in the said space and provided at their inner ends with spaced recesses forming bayonet slots arranged in pairs, a male member having a cylindrical portion fitting in the said annular space, male lugs carried by the male member for engaging the recesses of the female lugs and adapted when the male member is inserted in the female member to be brought into alignment with the recesses by a relative rotary movement of the coupling members in either direction, and means for retaining the male lugs in the recesses of the female lugs, said means including a push spring and a washer arranged within the female member and operating at the inner edges of the female lugs.

3. In combination in a coupling construction, complemental longitudinally extending tubular interfitting male and female coupling members having tubular sections extending longitudinally outwardly from the adjacent ends thereof which engage each other, the female member of which has an internal annular rib portion that is longitudinally outwardly spaced from the inner end of said member and a series of equally spaced circularly arranged symmetrically T-shaped internal guiding and holding projections, the crossbar of each T being constructed so as to provide a recess between each end of the crossbar and the stem of the T, the male member having a body portion with a cylindrical exterior section from which there radially projects equally spaced circularly arranged lugs that correspond in number to the T-shaped projections of the female member, each lug being of such dimension in a circumferential direction that the lugs as a set can slide through the guideway spaces provided between the cooperating ends of adjacent crossbars of the T's and also such that they can enter the recesses between the ends of the cross-bars and the stems of the T's, the lugs of the male members being of such longitudinal dimensions and so located that they can move in any circular direction into and through the spaces between the outer ends of the cross-bars of the T's and the internal annular rib portion, said stems of said T's having sufficient length to act as stops to limit rotation of said male member.

In testimony whereof, I have hereunto set my hand this 19th day of March 1931.

JOHN JOSEPH TOMPKINS.